US012779802B2

(12) United States Patent
Bourcier et al.

(10) Patent No.: US 12,779,802 B2
(45) Date of Patent: Nov. 3, 2026

(54) METHOD AND SYSTEM FOR SUPERPOSING OPHTHALMIC LENSES IN ORDER TO BUILD AN OPTICAL ASSEMBLY

(71) Applicant: Essilor International, Charenton-le-Pont (FR)

(72) Inventors: Laurent Bourcier, Dijon (FR); Antoine Monvoisin, Beire le Fort (FR)

(73) Assignee: Essilor International, Charenton-le-Pont (FR)

( * ) Notice: Subject to any disclaimer, the term of this patent is extended or adjusted under 35 U.S.C. 154(b) by 116 days.

(21) Appl. No.: 18/571,012

(22) PCT Filed: May 24, 2022

(86) PCT No.: PCT/EP2022/063954

§ 371 (c)(1),
(2) Date: Dec. 15, 2023

(87) PCT Pub. No.: WO2022/263117

PCT Pub. Date: Dec. 22, 2022

(65) Prior Publication Data

US 2024/0278515 A1 Aug. 22, 2024

(30) Foreign Application Priority Data

Jun. 17, 2021 (EP) .................................... 21305828

(51) Int. Cl.
*B29D 11/00* (2006.01)

(52) U.S. Cl.
CPC .. *B29D 11/00951* (2013.01); *B29D 11/00125* (2013.01)

(58) Field of Classification Search
CPC .................... B29D 11/00951; B29D 11/00125
See application file for complete search history.

(56) References Cited

U.S. PATENT DOCUMENTS 6,355,124 B1 3/2002 Blomberg et al.
6,439,870 B1 8/2002 Marceau et al.
(Continued)

FOREIGN PATENT DOCUMENTS

CN 112518276 A 3/2021
EP 1 289 738 B1 11/2004
JP 6-175088 * 6/1994

OTHER PUBLICATIONS

International Search Report & Written Opinion issued Aug. 24, 2022 in PCT/EP2022/063954, filed on May 24, 2022, 11 pages.
(Continued)

*Primary Examiner* — Mathieu D Vargot
(74) *Attorney, Agent, or Firm* — Oblon, McClelland, Maier & Neustadt, L.L.P.

(57) ABSTRACT

A method for superposing a first ophthalmic lens having a first face and a second ophthalmic lens having a second face in order to build an optical assembly delimited by the first and second faces. The method includes detecting respective positions in space and shapes of the first and second ophthalmic lenses, by using at least one sensor, detecting a first reference point on the first ophthalmic lens and a second reference point on the second ophthalmic lens, based on these respective positions in space and shapes, and modifying the respective positions so as to superpose the first and second reference points.

15 Claims, 1 Drawing Sheet

(56) References Cited

U.S. PATENT DOCUMENTS

| | | | | |
|---|---|---|---|---|
| 10,459,253 | B2 | 10/2019 | Ballet et al. | |
| 2016/0176131 | A1* | 6/2016 | Ihara | B29C 39/24 264/1.32 |
| 2016/0306176 | A1 | 10/2016 | Reignault et al. | |
| 2018/0196283 | A1 | 7/2018 | Ballet et al. | |
| 2018/0306720 | A1* | 10/2018 | Wang | G01N 21/6428 |

OTHER PUBLICATIONS

Combined Chinese Office Action and Search Report issued Jan. 30, 2026, in corresponding Chinese Patent Application No. 202280040454.4 (with English Translation), 17 pages.

* cited by examiner

METHOD AND SYSTEM FOR SUPERPOSING OPHTHALMIC LENSES IN ORDER TO BUILD AN OPTICAL ASSEMBLY

CROSS-REFERENCE TO RELATED APPLICATION

The present application is a national stage application of PCT Application No: PCT/EP2022/063954, filed May 24, 2022, which claims priority to European Patent Application No. 21305828.2, filed on Jun. 17, 2021. The benefit of priority is claimed to each of the foregoing, and the entire contents of each of the foregoing are incorporated herein by reference.

FIELD OF THE DISCLOSURE

The present disclosure relates to a method and system for superposing ophthalmic lenses in order to build an optical assembly.

BACKGROUND OF THE DISCLOSURE

An optical assembly considered in the present disclosure comprises two optical surfaces, e.g. two faces of ophthalmic lenses, which are superposed in a predetermined manner, e.g. center to center or using another reference point for superposition. The two superposed surfaces do not have necessarily the same size or shape.

For example, it may be necessary to superpose a plano lens with a lens giving a predetermined optical power to the assembly.

As another example, an electrochromic cell has typically a structure comprising two curved transparent outer layers that are two ophthalmic lenses, the inner surfaces of which are covered by a transparent electrically conductive coating.

The cavity located between the two electrically conductive coatings is filled with an electrochromic composition.

Thus, the light transmission factor of the cell can be varied, by applying an electrical field between the electrically conductive coatings.

The maintaining of the two outer layers and the closing of the cavity are performed by means of a peripheral sealing joint.

However, before applying the peripheral sealing joint, the two ophthalmic lenses have to be positioned very precisely with respect to each other, in order to be perfectly superposed when pressed against each other for forming the cavity.

Current techniques for positioning the two ophthalmic lenses with respect to each other generally concentrate the positioning variations due to dimensional tolerances on one single edge of the lenses. This has the drawback of amplifying the misalignment visual effect.

Moreover, lens shapes having a dissymmetry that is not perceptible require manual positioning.

Furthermore, the great diversity of lens shapes currently requires a corresponding great diversity of lens holders.

Document US 2016/306176 A1 discloses a method for encapsulating a light-guide optical element in a transparent capsule.

Therefore, there is an unfulfilled need for a method that makes it possible to accurately position the two lenses with respect to each other independently of their shapes and that avoids the need for a specific lens holder for each different lens shape.

SUMMARY OF THE DISCLOSURE

An object of the disclosure is to overcome at least some of the above-mentioned limitations of the prior art and fulfill the above-mentioned need.

To that end, the disclosure provides a method for superposing a first ophthalmic lens having a first face and a second ophthalmic lens having a second face in order to build an optical assembly delimited by the first and second faces, according to claim 1.

Thus, the disclosure provides a full superposing process for any kind of lens shape. The lenses may be originally roughly placed on a holder. It is not necessary to have one dedicated holder per lens shape.

Moreover, thanks to the reference points, the positioning variations due to dimensional tolerances are distributed throughout the whole contour of the lenses, instead of being concentrated on one single edge of the lenses.

To the same end, the present disclosure also provides a system for superposing a first ophthalmic lens having a first face and a second ophthalmic lens having a second face in order to build an optical assembly delimited by the first and second faces, according to claim 11.

According to particular possible features, which may be combined or taken alone, of the method and system succinctly described above:

- the first and second ophthalmic lenses may have different shapes;
- at least one of the at least one sensor may be contactless;
- the at least one contactless sensor may comprise at least two image capture devices and the detecting respective positions in space and shapes may comprise obtaining by the at least two image capture devices a tridimensional modeling of the first and second ophthalmic lenses;
- detecting respective positions in space and shapes may further comprise contacting at least one of the first ophthalmic lens and the second ophthalmic lens by at least one of the at least one sensor;
- the at least one sensor used for the contacting may comprise at least one touch probe;
- the method may further comprise correcting at least one of the respective positions in space after detecting the respective positions in space and before detecting the first and second reference points;
- modifying the respective positions may comprise holding and moving at least one of the first and second ophthalmic lenses with at least one movable robotic gripper;
- the method may further comprise, prior to the step of modifying:
- cleaning the first and second ophthalmic lenses,
- applying an adhesive substance at a periphery of the optical assembly;
- the method may further comprise, prior to detecting the respective positions in space and shapes:
- roughly positioning the first ophthalmic lens and the second ophthalmic lens in a predetermined area of a lens holder so that the first and second ophthalmic lenses face each other.

As the system succinctly described above has the same advantages as the method, those advantages are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE DISCLOSURE

Figure 1:
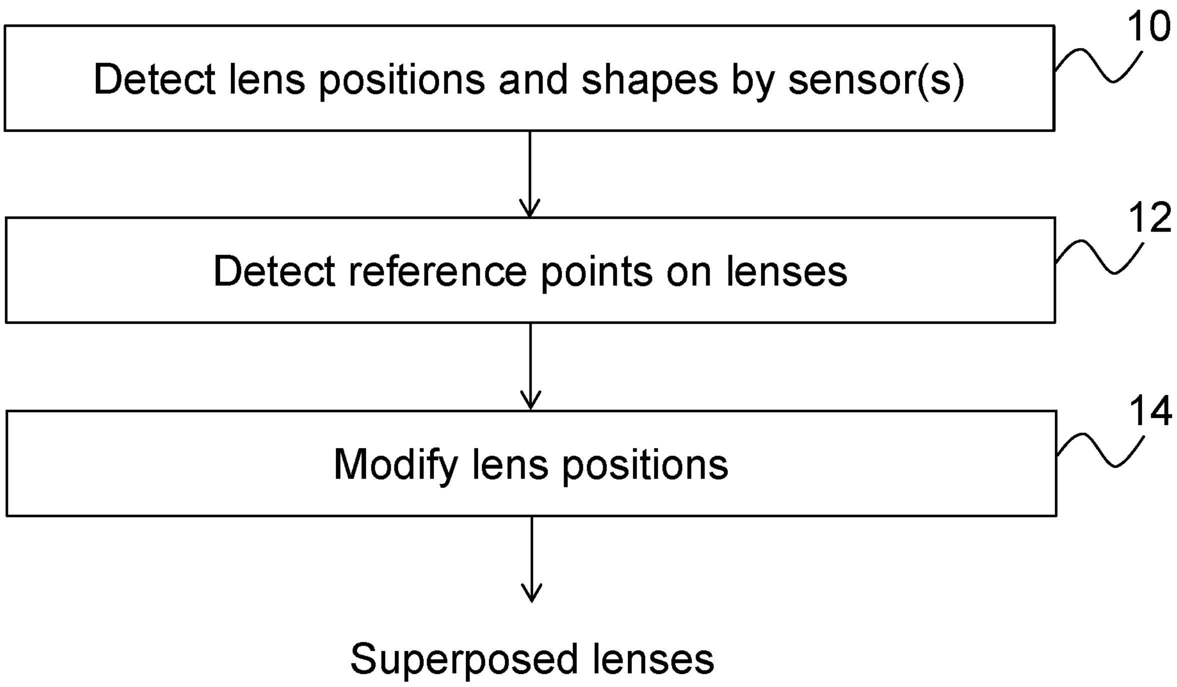
FIG. 1 is a flow diagram showing steps of a method according to the disclosure for superposing two ophthalmic lenses in order to build an optical assembly, in a particular embodiment.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

In the present disclosure, a first ophthalmic lens having a first face and a second ophthalmic lens having a second face are considered. The first and second face may for example be spherical. They have to be superposed in order to build an optical assembly delimited by the first and second faces. The first and second faces may have the same radius of curvature. By way of non-limiting example, the optical assembly may be an electrochromic cell comprising a cavity delimited by the first and second faces of the two above-mentioned lenses.

Both lenses may have the same shape, or they may have different shapes. The present disclosure applies to any lens shape.

As shown in the flow diagram of FIG. 1, in a particular embodiment, a first step 10 of the proposed method for superposing the first and second ophthalmic lenses comprises detecting the respective positions in space of the first and second lenses, as well as their respective shapes.

Optionally, before step 10, the method may comprise roughly positioning the two lenses in a predetermined area of any conventional lens holder, so that the first and second lenses face each other.

Step 10 is carried out by using at least one sensor.

Depending on the embodiment, various types of sensors may be used.

In some embodiments, the one or more sensors may be contactless.

For example, the contactless sensor(s) may comprise two or more image capture devices. In such an embodiment, step 10 comprises obtaining by the image capture devices a tridimensional modeling of the first and second lenses. To that end, the image capture devices are located in such a way that they have a top view and a lateral view of each lens. The tridimensional modeling may involve any technique known per se, such as digital interpolation. The position in space may be defined in a referential with three orthogonal axes X, Y, Z by a pitch plan YZ, a roll plan XZ and a yaw plan XY.

Both the positions in space and the shapes of the two lenses are thus detected.

For carrying out step 10, in addition to the at least one contactless sensor or in replacement thereof, the first and second lenses may be contacted by at least one other type of sensor capable of detecting the respective positions in space and shapes of the lenses. For example, such one or more sensors may comprise at least one touch probe for contacting the lenses in a predetermined number of measurement points. By way of non-limiting example, the number of measurement points may be between 5 and 9.

After the detecting step 10, an optional step (not shown in FIG. 1) may be carried out for correcting, where necessary, the position in space of the first lens and/or of the second lens, for example if the touch probe(s) detect incorrect positioning of the lenses. This may be done either manually, or by means of one or more movable robotic grippers each gripping and moving one lens. Only one of the two lenses needs to be moved to correct the relative positioning of one lens with respect to the other. Nevertheless, although this may be more complex to implement, both lenses may be moved simultaneously during that optional step.

Next, a step 12 of detecting a first reference point on the first lens and a second reference point on the second lens is carried out.

For such detection, step 12 uses the information about the position in space and the shape of each lens detected at step 10. If the positions have been modified during the optional step described previously, the corrected positions are known and the shapes are unchanged, so that step 12 can be carried out without based on the updated information regarding the lens positions.

By way of non-limiting examples, the first and second reference points may be the geometric centers of the lenses, or the barycenters of the lens shapes.

Optionally, after the detecting step 12, the method according to the disclosure may comprise steps of cleaning the lenses and of applying an adhesive substance at the periphery of the optical assembly, for example at the periphery of the cavity in the non-limiting example where the optical assembly is an electrochromic cell. For performing the cleaning step, a fixed nozzle may dispatch a cleaning substance on the lenses. For performing the applying step, another fixed nozzle may dispatch the adhesive substance at the periphery of one of the lenses.

As shown in FIG. 1, the following step 14 of the method according to the present disclosure comprises modifying the respective positions of the lenses, so as to superpose the first and second reference points that have been detected at step 12.

In a particular embodiment, the modifying step 14 comprises holding and moving at least one of the lenses with at least one movable robotic gripper. The robotic gripper(s) may be the same as the one(s) used for correcting the position in space of the lenses, if such optional step is carried out.

Figure 2:
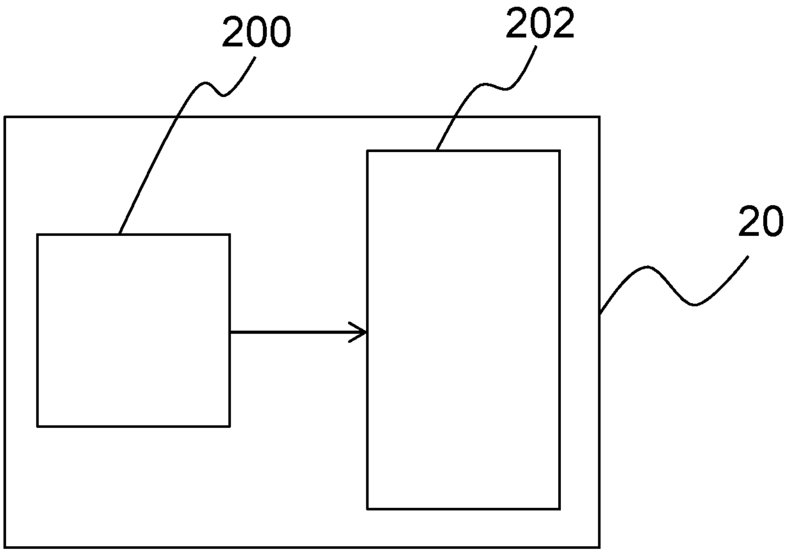
FIG. 2 is a schematic view of a system according to the disclosure for superposing two ophthalmic lenses in order to build an optical assembly, in a particular embodiment.

As shown in FIG. 2, in a particular embodiment, a system 20 for superposing the first ophthalmic lens and the second ophthalmic lens in order to build an optical assembly, as mentioned above in relationship with the proposed method, comprises at least one sensor 200 for detecting respective positions in space and shapes of the two lenses. As well as for the proposed method, the lenses may either have the same shapes, or have different shapes.

As mentioned above, the at least one sensor 200 may be contactless and in such embodiments, it may comprise at least two image capture devices. As also mentioned above, in addition to the contactless sensor(s) or in replacement thereof, the at least one sensor 200 may comprise at least one touch probe, for contacting the lenses and making it possible to detect their respective positions in space and their respective shapes.

The proposed system 20 further comprises at least one movable robotic gripper 202 for gripping and moving the lenses, thus modifying the respective positions in space of the lenses. As mentioned above in relationship with the proposed method, the one or more movable robotic grippers 202 may also be used to correct the positions in space of one of the lenses or of both lenses, for example if the one or more touch probes detect incorrect positioning of the lenses.

Although representative methods and devices have been described in detail herein, those skilled in the art will recognize that various substitutions and modifications may be made without departing from the scope of what is described and defined by the appended claims.

The invention claimed is:

1. A method for superposing a first ophthalmic lens having a first face and a second ophthalmic lens having a second face in order to build an optical assembly delimited by said first and second faces, the method comprising:

detecting respective positions in space and shapes of said first and second ophthalmic lenses, by using at least one touch probe and at least two image capture devices, said at least two image capture devices being positioned to capture a top view and a lateral view of each of said first and second ophthalmic lenses, and said at least one touch probe being configured to contact the first ophthalmic lens and the second ophthalmic lens in a predetermined number of measurement points;

detecting a first reference point on said first ophthalmic lens and a second reference point on said second ophthalmic lens, based on said respective positions in space and shapes; and modifying said respective positions so as to superpose said first and second reference points.

2. The method according to claim 1, wherein said first and second ophthalmic lenses have different shapes.

3. The method according to claim 1, wherein at least one of said at least two image capture devices is contactless.

4. The method according to claim 3, wherein said detecting respective positions in space and shapes comprises obtaining by said at least two image capture devices a tridimensional modeling of said first and second ophthalmic lenses.

5. The method according to claim 1, further comprising correcting at least one of said respective positions in space after said detecting said respective positions in space and before said detecting said first and second reference points.

6. The method according to claim 1, wherein said modifying said respective positions comprises holding and moving at least one of said first and second ophthalmic lenses with at least one movable robotic gripper.

7. The method according to claim 1, further comprising, prior to said modifying:

cleaning said first and second ophthalmic lenses; and applying an adhesive substance at a periphery of said optical assembly.

8. The method according to claim 1, further comprising, prior to said detecting said respective positions in space and shapes:

roughly positioning said first ophthalmic lens and said second ophthalmic lens in a predetermined area of a lens holder so that said first and second ophthalmic lenses face each other.

9. A system for superposing a first ophthalmic lens having a first face and a second ophthalmic lens having a second face in order to build an optical assembly delimited by said first and second faces, the system comprising:

said first and second ophthalmic lenses;

at least one touch probe and at least two image capture devices configured to detect respective positions in space and shapes of said first and second ophthalmic lenses, said at least two image capture devices being positioned to capture a top view and a lateral view of each of said first and second ophthalmic lenses, and said at least one touch probe being configured to contact the first ophthalmic lens and the second ophthalmic lens in a predetermined number of measurement points; and at least one movable robotic gripper configured to modify said respective positions.

10. The system according to claim 9, wherein said first and second ophthalmic lenses have different shapes.

11. The system according to claim 9, wherein at least one of said at least two image capture devices is contactless.

12. The method according to claim 2, wherein at least one of said at least two image capture devices is contactless.

13. The method according to claim 4, further comprising correcting at least one of said respective positions in space after said detecting said respective positions in space and before said detecting said first and second reference points.

14. The method according to claim 5, wherein said modifying said respective positions comprises holding and moving at least one of said first and second ophthalmic lenses with at least one movable robotic gripper.

15. The method according to claim 6, further comprising, prior to said modifying:

cleaning said first and second ophthalmic lenses; and applying an adhesive substance at a periphery of said optical assembly.

* * * * *